United States Patent [19]

Kishimoto

[11] Patent Number: 5,083,542
[45] Date of Patent: Jan. 28, 1992

[54] LINK MECHANISM FOR A VEHICULAR CRUISE CONTROL APPARATUS

[75] Inventor: Shiro Kishimoto, Himeji, Japan
[73] Assignee: Mitsubishi Denki Kabushiki Kaisha, Tokyo, Japan
[21] Appl. No.: 620,161
[22] Filed: Nov. 30, 1990
[30] Foreign Application Priority Data
Dec. 4, 1989 [JP] Japan .................... 1-140944
[51] Int. Cl.⁵ .............................................. F02D 9/00
[52] U.S. Cl. .................................... 123/400; 180/170
[58] Field of Search ............... 123/342, 376, 396, 400, 123/352; 180/175, 179, 197, 170

[56] References Cited

U.S. PATENT DOCUMENTS 4,889,093 12/1989 Nishiyama et al. ................. 123/400
4,938,830  7/1990 Yamaguchi et al. ............ 123/342 X Primary Examiner—Tony M. Argenbright
Attorney, Agent, or Firm—Sughrue, Mion, Zinn, Macpeak and Seas

[57] ABSTRACT

An improved link mechanism for a vehicular cruise control apparatus equally usable with right-hand steering and left-hand steering automobiles. A first, circular lever 1' is selectively connected with one end of a first cable 6 which is connected to an accelerator pedal at its other end. The pedal can be disposed on the right side of the first lever for a right-hand steering vehicle, or on the left side thereof for a left-hand steering vehicle. A second, semicircular lever 2 is connected with one end of a second cable 7 which is secured at its other end to a throttle valve. A third, semicircular lever 3 is connected with one end of a third cable 8 which is secured at its other end to a cruise control actuator. The first through third levers are rotatably mounted on a support shaft 4 such that when the accelerator pedal is depressed by the driver, the first lever is operated through the first cable to rotate the second lever independently of the third lever for controlling the throttle valve, whereas when the cruise control is actuated, the third lever is operated through the third cable to rotate the second lever independently of the first lever for controlling the throttle valve. The first lever has first and second, diametrically opposite attachments for selective connection to the first cable.

6 Claims, 2 Drawing Sheets

LINK MECHANISM FOR A VEHICULAR CRUISE CONTROL APPARATUS

BACKGROUND OF THE INVENTION

The present invention relates to a link mechanism for a vehicular cruise control apparatus which is usable with a left-sided steering-wheel car or a right-sided steering-wheel car.

FIGS. 3 and 4 show a known link mechanism for a vehicular cruise control apparatus. The known link mechanism illustrated includes a first lever 1, a second lever 2 and a third lever 3, all of which are of semicircular configurations and rotatably mounted on a support shaft 4 in such a manner that they are rotatable relative to the support shaft independently of each other. A main frame 5 has a pair of upright brackets 50, 51 on which the support shaft 4 is fixedly supported at the opposite ends thereof.

The first lever 1 comprises a pair of opposed sector-shaped side plates 10, 11 which are integrally secured to each other at their central boss portions to form a kind of a semicircular pulley. The plate 10 has one end thereof outwardly bent at right angles to form an engagement piece 1a. The other plate 11 has one end thereof opposing to the other end of the plate 10 outwardly bent at right angles to form an engagement piece 1p. The thus constructed first lever 1 is urged by a coiled spring 100 in such a manner that the engagement piece 1a thereof is placed into abutting engagement with a corresponding engagement piece 5a of the upright bracket 50. In FIG. 3, the engagement piece 1a of the plate 10 abuts against the engagement piece 5a of the upright bracket 50 from the right-hand direction. A first or accelerator cable 6 extending from an unillustrated accelerator pedal of the vehicle upwardly extends around the semicircular circumferential periphery of the first lever 1 so as to be connected at one end thereof with a T-shaped attachment 1n of the first lever 1. Thus, when the driver steps on the unillustrated accelerator pedal, the first lever 1 is caused to rotate around the support shaft 4 against the bias of the coiled spring 100 through the pull of the accelerator cable 6 in proportion with the extent to which the accelerator pedal is depressed. Specifically, the engagement piece 1a of the plate 10 is moved to the right in FIG. 3 in a direction away from the engagement piece 5a of the upright bracket 50. When the accelerator pedal is released, the first lever 1 is caused to return to the illustrated initial position under the action of the coiled spring 100.

Likewise, the second lever 2 comprises a pair of sector-shaped side plates 20, 21 which, like the first lever 1, are integrally secured to each other at their central boss portions to form a kind of a semicircular pulley. The side plate 20 has one end thereof outwardly bent at right angles to form an engagment piece 2p which is placed in confrontation with the engagement piece 1p of the first lever 1. As shown in FIG. 3, the engagement piece 2p of the plate 20 is located above the engagement piece 1p of the first lever 1 in confrontation therewith. Accordingly, as the first lever 1 rotates against the bias of the coiled spring 100, the second lever 2 is caused to rotate through the engagement of the engagement piece 2p thereof with the engagement piece 1p of the first lever 1. However, when the second lever 2 follows the motion of the third lever 3, which will be described later in detail, the engagement piece 2p of the second lever 2 moves in a direction away from the engagement piece 1p of the first plate 1. The side plate 20 also has the other end inwardly bent to form an engagement piece 2t. A second or throttle cable 7 extending from an unillustrated throttle valve to the second lever 2 downwardly extends around the semicircular-shaped circumferential periphery of the second lever 2 from the top to the bottom thereof so as to be connected at one end thereof with a T-shaped attachment 2n of the second lever 2 in the same manner as with the first lever 1 at a location near the engagement piece 2t. Thus, as the driver steps on the accelerator pedal, the accelerator cable 6 is pulled by the accelerator pedal so as to rotate the first lever 1 through an angle proportional to the extent to which the accelerator pedal is depressed. In accordance with the rotation of the first lever 1, the engagement piece 1p thereof upwardly pushes the engagement piece 2p of the second lever 2, thereby causing the second lever 2 to rotate around the support shaft 4 in a direction to move the unillustrated throttle valve in the opening direction through the throttle cable 7. On the other hand, when the accelerator pedal is released, the first and second levers 1 and 2 are restored to their initial positions as illustrated in FIGS. 3 and 4 under the action of the coiled spring 100 and an unillustrated return spring which acts to urge the throttle valve in the closing direction.

The third lever 3 comprises a pair of opposed sector-shaped side plates 30, 31, as in the case of the first and second levers 1, 2. The side plate 30 is integrally formed at one end thereof with an engagement piece 3t at a location confronting the engagement piece 2t of the second lever 2. As shown in FIG. 3, the engagement piece 2t is located below the engagement piece 3t in a confronting relation therewith. Likewise, the other side plate 31 is integrally formed, at one end thereof opposing the other end of the side plate 30, with an engagement edge 3b which is disposed in confrontation with an engagement piece 5b which is integrally formed with, and inwardly bent substantially at right angles from, the upright bracket 51 of the main frame 5. The third lever 3 is urged by a coiled spring 300 in such a manner that the engagement edge 3b thereof is placed in abutting engagement with the engagement piece 5b of the upright bracket 51. Specifically, as shown in FIG. 3, the engagement edge 3b abuts against the engagement piece 5b from the left. This biasing direction of the engagement edge 3b due to the coiled spring 300 is the same as that of the first lever 1 due to the coiled spring 100. A third or actuator cable 8 extends from an unillustrated cruise control actuator to the third lever 3 from a direction opposite to the direction from which the accelerator and throttle cables 6 and 7 extend to the first and second levers 1, 2. The actuator cable 8 downwardly extends around the semicircular-shaped circumferential periphery of the third lever 3 from the top to the bottom thereof. In this manner, the actuator cable 8 is connected at one end thereof with a T-shaped attachment 3n of the third lever 3 in the same manner as with the accelerator cable 6. Thus, as the unillustrated cruise control actuator is energized, the third lever 3 is caused by the actuator to rotate around the support shaft 4 against the bias of the coiled spring 300. In accordance with the rotation of the third lever 3, the engagement piece 3t thereof pushes down the engagement piece 2t of the second lever 2 so as to rotate the second lever 2 in such a direction as to move the engagement piece 2p thereof away from the engagement piece 1p of the first lever 1, thereby causing the unillustrated throttle valve to open. When the actuator is deenergized, the second and third levers 2, 3 are restored to their initial positions as illustrated in FIGS. 3 and 4 under the action of the coiled spring 300 and the unillustrated return spring which urges the throttle valve in the closing direction.

The operation of the above-mentioned known link mechanism will now be described in detail. First, let us consider the case in which the vehicle performs normal travel without cruise control. In this case, when the driver operates to change an unillustrated transmission so as to select an appropriate gear ratio and then steps on the accelerator pedal in order to accelerate the vehicle, the first lever 1 is first caused to rotate through the pull of the accelerator cable 6 whereby the second lever 2 is rotated through the engagement between the engagement pieces 1p, 2p. Accordingly, the second lever 2 operates to pull the throttle cable 7, thus moving the throttle valve in the opening direction. As a result, large amount of air/fuel mixture is sucked into the engine of the vehicle so as to increase the rotational speed of the engine, thus accelerating the vehicle.

Subsequently, when the driver starts cruise control after the speed of the vehicle reaches a certain level, the unillustrated cruise control actuator is energized by an output signal from an unillustrated speed sensor to provide a pull on the actuator cable 8, thereby rotating the third lever 3. At this time, even though the driver still continues to step on the accelerator pedal, the engagement piece 3t of the third lever 3 remains out of engagement with the engagement piece 2t of the second lever 2 since the second lever 2 follows the motion of the first lever 1. However, the engagement piece 3t of the third lever 3 comes into the vicinity of the engagement piece 2t of the second lever 2, so that when the driver releases the accelerator pedal, the second lever 2 is forced to return to its initial position due to an unillustrated return spring which urges the throttle valve in the closing direction. Accordingly, the engagement piece 2t of the second lever 2 is placed into abutting engagement with the engagement piece 3t of the third lever 3 so that the second lever 2 is forced to follow the motion of the third lever 3, thus making the vehicle travel under the control of the cruise control actuator.

In addition, during the time that the vehicle is travelling under cruise control, when the driver steps on the brake pedal or releases the cruise control, the cruise control actuator is deenergized to return to the initial condition, placing the vehicle under normal control in which the driver can normally control the vehicle through the accelerator pedal.

Although there are two kinds of automobiles, i.e., one having a right-hand steering wheel and the other having a left-hand steering wheel, the positions of a throttle valve and a cruise control actuator are the same or constant irrespective of these kinds of automobiles, but the position of an accelerator pedal alone varies, i.e., it is located on the right side or the left side in a driver's compartment of a vehicle, depending upon the kinds of automobile. As a result, the above-described known link mechanism having one and the same construction can not be equally applied to a right-hand steering-wheel automobile and a left-hand steering-wheel automobile. The link mechanism shown in FIG. 3 is for a left-hand steering-wheel automobile and hence the accelerator cable 6 extends from the first lever 1 towards an unillustrated left-hand accelerator pedal. In order to apply the illustrated link mechanism to a right-hand steering-wheel automobile, it is necessary to reverse the right and left portions thereof, but in this case, the throttle cable 7 is disposed on the right side and the actuator cable 8 is disposed on the left side. Therefore, in the past, two kinds of link mechanisms had to be manufactured, one for a right-hand steering-wheel automobile and the other for a left-hand steering-wheel automobile. As a result, the production costs as well as storage costs for producing and storing in warehouses two kinds of link mechanisms become relatively high as compared with those for a single kind of link mechanism.

SUMMARY OF THE INVENTION

Accordingly, the present invention is intended to obviate the above described problems of the known link mechanism for an automotive cruise control apparatus.

An object of the present invention is to provide an improved link mechanism for an automotive cruise control apparatus which is able to be equally used with a right-hand steering-wheel automobile and a left-hand steering-wheel automobile.

In order to achieve the above object, according to the present invention, there is provided a link mechanism for a vehicular cruise control apparatus comprising:

a first lever having a substantially circular configuration and adapted to be selectively connected with one end of a first cable which is connected at the other end thereof with an accelerator pedal which is disposed on one side of the first lever or on the opposed side thereof;

a second lever having a substantially semicircular configuration and adapted to be connected with one end of a second cable which is connected at the other end thereof with a throttle valve;

a third lever having a substantially semicircular configuration and adapted to be connected with one end of a third cable which is connected at the other end thereof with a cruise control actuator;

a frame;

a support shaft installed on the frame and rotatably mounting thereon the first through third levers in such a manner that these levers are rotatable relative to the support shaft independently of each other;

wherein the first through third levers are disposed in such a manner that when the accelerator pedal is depressed by the driver, the first lever is operated through the first cable to rotate the second lever around the support shaft independently of the third lever for controlling the throttle valve, whereas when the cruise control actuator is energized, the third lever is operated through the third cable to rotate the second lever around the support shaft independently of the first lever for controlling the throttle valve.

Preferably, the first lever has two attaching means disposed in a diametrically opposite relation with each other. One of the attaching means is usable with a right-hand steering-wheel vehicle, and it is attachable to one end of the first cable which extends from the accelerator pedal disposed on the one side of the first lever. The other attaching means is usable with a left-hand steering-wheel vehicle, and it is attachable to one end of the first cable which extends from the accelerator pedal disposed on the opposed side of the first lever.

According to the present invention, due to the circular shape of the first lever, it can be selectively connected with an accelerator cable from an accelerator pedal of a right-hand steering-wheel automobile and an accelerator cable from an accelerator pedal of a left-hand steering-wheel automobile. Thus, only a single kind of link mechanism can be readily used with both a right-hand steering-wheel automobile and a left-hand steering-wheel automobile without any difficulty. As a result, it becomes possible to standardize the link mechanism into a single kind, providing a substantial cost reduction due to the increased number of single kind of products as well as a great advantage from the part-management point of view.

The above and other objects, features and advantages of the present invention will become apparent from the following detailed description of a preferred embodiment thereof taken in conjunction with the accompanying drawings.

DESCRIPTION OF THE PREFERRED EMBODIMENT

The present invention will now be described in detail with reference to a preferred embodiment thereof as illustrated in the accompanying drawings.

Figure 1:
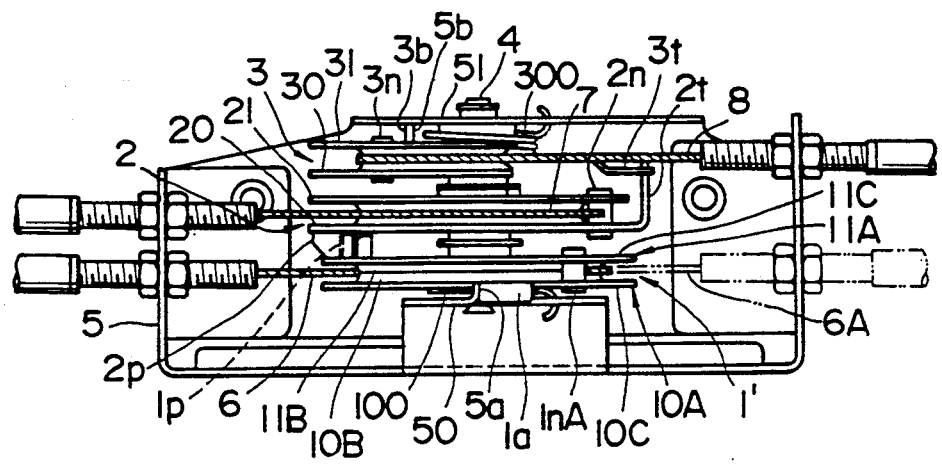
FIG. 1 is a plan view of a link mechanism for a vehicular cruise control apparatus in accordance with the present invention.
Figure 2:
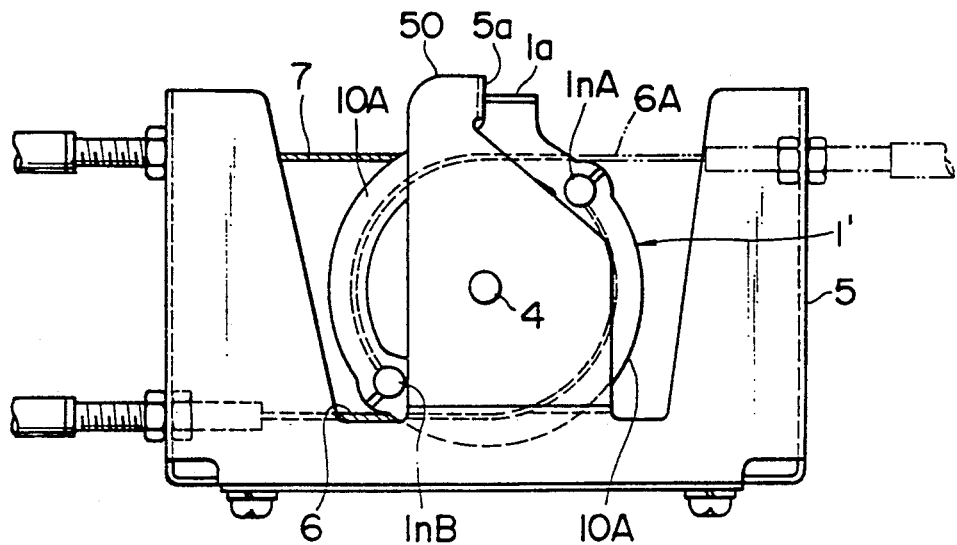
FIG. 2 is a side elevation of the link mechanism of FIG. 1.

Referring to FIGS. 1 and 2, there is shown a link mechanism for a vehicular cruise control apparatus constructed in accordance with the present invention. The link mechanism illustrated is substantially similar in construction and operation to the aforementioned known link mechanism of FIGS. 3 and 4 but differs therefrom in the following features which will be described below. The same or corresponding components of this embodiment as those of the known link mechanism are identified by the same symbols as employed in FIGS. 3 and 4, and a detailed description thereof is omitted.

Figure 3:
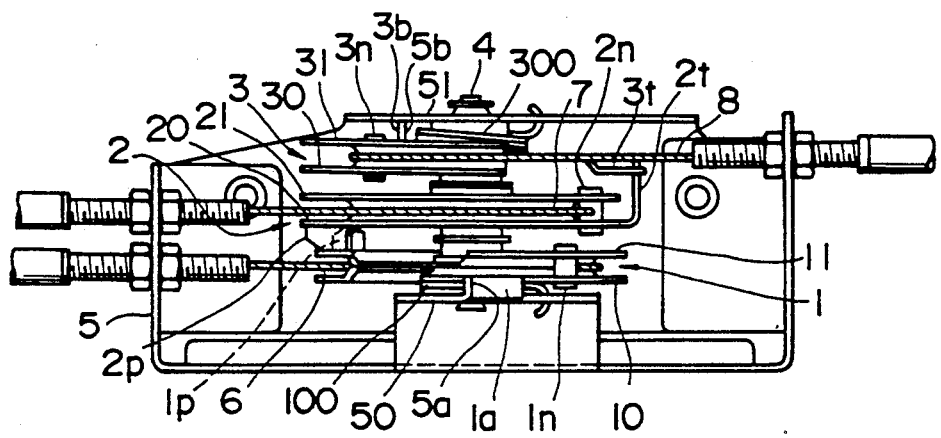
FIG. 3 is a plan view of a known link mechanism for a vehicular cruise control apparatus.
Figure 4:
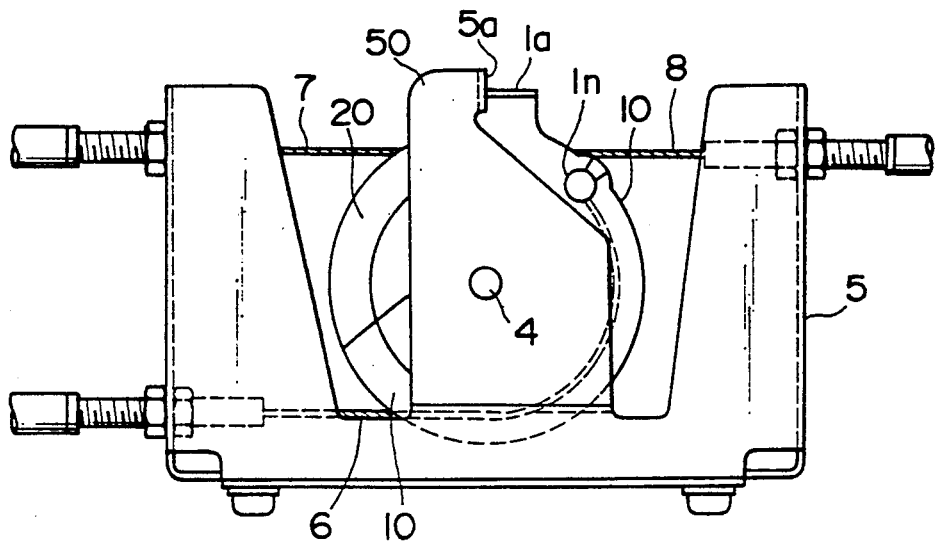
FIG. 4 is a side elevation of the known link mechanism of FIG. 3.

Specifically, the link mechanism of this embodiment includes, in addition to a second lever 2 and a third lever 3 which are the same as those of the known link mechanism of FIGS. 3 and 4, a first lever 1' which comprises a pair of side plates 10A, 11A each having a circular configuration. Each of the circular-shaped side plates 10A, 11A has a central boss or roller portion 10B, 11B and an annular flange portion 10C, 11C which is integrally formed with, and extends radially outwardly from the central boss portion 10B, 11B. The flange portions 10C, 11C has a pair of first and second attaching means 1nA, 1nB each in the form of a T-shaped attachment provided thereon at locations near the outer circumferential edge thereof for attaching one end of an accelerator cable 6 which extends from an unillustrated accelerator pedal. The first and second attachments 1nA, 1nB are disposed in a diametrically opposite relation with each other. The first attachment 1nA is for a left-hand steering-wheel automobile in which an accelerator cable 6 (e.g., designated by the solid line in FIG. 2) extends from an unillustrated left-hand accelerator pedal or from the left to the first lever 1' whereas the second attachment 1nB is for a right-hand steering-wheel automobile in which an accelerator cable 6A (e.g., designated by the phantom line in FIG. 2) extends from an unillustrated right-hand accelerator pedal or from the right to the first lever 1'.

Thus, with a left-hand steering-wheel car, an accelerator cable 6 from a left-hand accelerator pedal or from the left in FIG. 2 upwardly extends around the boss or roller portions 10B, 11B of the first lever 1' so as to be connected at one end thereof with the first T-shaped attachment 1nA of the first lever 1'. On the other hand, with a right-hand steering-wheel car, an accelerator cable 6A from a right-hand accelerator pedal or from the right in FIG. 2 downwardly extends around the boss portion or roller portions 10B, 11B of the first lever 1' and it is connected with the second T-shaped attachment 1nB of the first lever 1'. Accordingly, the link mechanism of the present invention can be commonly used with a left-hand steering-wheel car and a right-hand steering-wheel car. As a result, there is no need for separately producing two kinds of link mechanisms for left-hand and right-hand steering-wheel cars, so the production costs and the costs for storing the products in warehouses can be tremendously reduced.

What is claimed is:

1. A link mechanism for a vehicular cruise control apparatus comprising:

a first lever having a substantially circular configuration and adapted to be selectively connected with one end of a first cable which is connected at the other end thereof with an accelerator pedal which is disposed on one side of said first lever or on the opposed side thereof;

a second lever having a substantially semicircular configuration and adapted to be connected with one end of a second cable which is connected at the other end thereof with a throttle valve;

a third lever having a substantially semicircular configuration and adapted to be connected with one end of a third cable which is connected at the other end thereof with a cruise control actuator;

a frame;

a support shaft installed on said frame and rotatably mounting thereon said first through third levers in such a manner that these levers are rotatable relative to said support shaft independently of each other;

wherein said first through third levers are disposed in such a manner that when the accelerator pedal is depressed by the driver, said first lever is operated through said first cable to rotate said second lever around said support shaft independently of said third lever for controlling the throttle valve, whereas when the cruise control actuator is energized, said third lever is operated through the third cable to rotate said second lever around said support shaft independently of said first lever for controlling the throttle valve.

2. A link mechanism according to claim 1, wherein said first lever has two attaching means disposed in a diametrically opposite relation with each other, one of said attaching means being attachable to one end of the first cable which extends from the accelerator pedal disposed on the one side of said first lever, the other attaching means being attachable to one end of the first cable which extends from the accelerator pedal disposed on the opposed side of said first lever.

3. A link mechanism according to claim 2, wherein one of said attaching means is for use with a right-hand steering-wheel vehicle, and the other attaching means is for use with a left-hand steering-wheel vehicle.

4. A link mechanism according to claim 1, wherein said first and second levers have engagement pieces which are engageable with each other in such a manner that the rotation of said first lever is transmitted to said second lever through the engagement of said engagement pieces.

5. A link mechanism according to claim 1, wherein said second and third levers have engagement pieces which are engageable with each other in such a manner that the rotation of said third lever is transmitted to said second lever through the engagement of said engagement pieces.

6. A link mechanism according to claim 1, wherein said first lever and said frame have engagement pieces which are engageable with each other for limiting the rotation of said first lever relative to said support shaft, and said third lever and said frame have engagement pieces which are engageable with each other for limiting the rotation of said third lever relative to said support shaft.

* * * * *